(12) United States Patent
Krishnamurthy et al.

(10) Patent No.: US 11,729,306 B1
(45) Date of Patent: Aug. 15, 2023

(54) MANAGING A GRAPHICAL USER INTERFACE OF A DISPLAY DEVICE

(71) Applicant: Dell Products L.P., Round Rock, TX (US)

(72) Inventors: Ganesh Krishnamurthy, Bangalore (IN); Malathi R, Madurai (IN); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/658,099

(22) Filed: Apr. 6, 2022

(51) Int. Cl.
  *H04M 1/72454* (2021.01)
  *G06V 40/18* (2022.01)
  *G06F 3/04847* (2022.01)

(52) U.S. Cl.
  CPC .... *H04M 1/72454* (2021.01); *G06F 3/04847* (2013.01); *G06V 40/18* (2022.01); *H04M 2201/42* (2013.01)

(58) Field of Classification Search
  CPC . H04M 1/72454; G06V 40/18; G06F 3/04847
  See application file for complete search history.

(56) References Cited

U.S. PATENT DOCUMENTS

| | | | |
|---|---|---|---|
| 11,428,955 B1 * | 8/2022 | Lewis | G02C 7/101 |
| 2021/0117048 A1 * | 4/2021 | Grieves | G06F 3/01 |

OTHER PUBLICATIONS

Mohammed Iqbal, Omar Said, Ola Ibrahim, Ashraf Soliman, "Visual Sequelae of Computer Vision Syndrome: A Cross-Sectional Case-Control Study", Journal of Ophthalmology, vol. 2021, Article ID 6630286, 16 pages, 2021. https://doi.org/10.1155/2021/6630286.

* cited by examiner

*Primary Examiner* — Gerald Johnson
(74) *Attorney, Agent, or Firm* — McDermott Will & Emery LLP

(57) ABSTRACT

Performing, at a first time, a calibration and configuration of a display magnification management model, including: identifying contextual data associated with contextual inputs of a user including a blink rate and a distance between the user and the display device; identifying display settings of the GUI; training, based on the contextual data and the display settings, the display magnification management model, including generating a configuration policy including configuration rules for performing computer-implemented actions to automatically adjust the magnification level of the GUI; performing, at a second time, a steady-state management of the magnification level of the GUI, including: monitoring the contextual inputs of the of the user, in response, i) accessing the display magnification management model, ii) identifying configuration rules based on the display settings and the monitored contextual inputs, and iii) applying the configuration rules to perform computer-implemented actions to automatically adjust the magnification level of the GUI.

17 Claims, 6 Drawing Sheets

MANAGING A GRAPHICAL USER INTERFACE OF A DISPLAY DEVICE

BACKGROUND

Field of the Disclosure

The disclosure relates generally to an information handling system, and in particular, managing a magnification level of a graphical user interface of a display device.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Use of digital displays can impact the eyes of a user over periods of time (e.g., continued usage during working, studying, reading, gaming, and the similar). Such impacts can lead to vision syndrome issues or eye disease (e.g., cataracts, eye refractive errors).

SUMMARY

Innovative aspects of the subject matter described in this specification may be embodied in a method of managing a magnification level of a graphical user interface (GUI) of a display device associated with an information handling system, including: performing, at a first time, a calibration and configuration of a display magnification management model, including: identifying contextual data associated with contextual inputs of a user associated with the information handling system, the contextual data including i) a blink rate of the user associated with the information handling system and ii) a distance between the user and the display device of the information handling system; identifying display settings of the GUI of the display device; training, based on the contextual data and the display settings, the display magnification management model, including generating a configuration policy including configuration rules, the configuration rules for performing computer-implemented actions to automatically adjust the magnification level of the GUI of the display device without user interaction; performing, at a second time, a steady-state management of the magnification level of the GUI of the display device, including: monitoring the contextual inputs of the of the user associated with the information handling system; and in response to monitoring the contextual inputs of the user associated with the information handling system, i) accessing the display magnification management model including the configuration policy, ii) identifying one or more of the configuration rules based on the display settings of the GUI and the monitored contextual inputs, and iii) applying the one or more configuration rules to perform one or more of the computer-implemented actions to automatically adjust the magnification level of the GUI of the display device without user interaction.

Other embodiments of these aspects include corresponding systems, apparatus, and computer programs, configured to perform the actions of the methods, encoded on computer storage devices.

These and other embodiments may each optionally include one or more of the following features. For instance, the display settings of the GUI includes a resolution of the GUI, a font size of text displayed by the GUI, and a screen ratio of the GUI. The contextual data further includes a pupil size of the user associated with the information handling system. Performing the calibration and configuration of the display magnification management model further comprises: identifying a computer-implemented application currently executing by the information handling system and is associated with the GUI of the display device; and training, based on i) the contextual data, ii) the display settings, and iii) the computer-implemented application currently executing by the information handling system, the display magnification management model, including generating the configuration policy including configuration rules, the configuration rules for performing computer-implemented actions to automatically adjust the magnification level of the GUI of the display device without user interaction. Wherein performing a steady-state management of the magnification level of the GUI of the display device further comprises: in response to monitoring the contextual inputs of the user associated with the information handling system, i) accessing the display magnification management model including the configuration policy, ii) identifying one or more of the configuration rules based on the display settings of the GUI, the computer-implemented application currently executing by the information handling system, and the monitored contextual inputs, and iii) applying the one or more configuration rules to perform one or more of the computer-implemented actions to automatically adjust the magnification level of the GUI of the display device without user interaction. Determining a currently elapsed time for performing the steady-state management of the magnification level of the GUI of the display device; comparing the currently elapsed time to a time threshold; determining, based on the comparing, that the currently elapsed time is greater than the time threshold; and in response to the determining, offloading at least a portion of the steady-state management of the magnification level of the GUI of the display device to a cloud-based information handling system. Determining a computational resource load of performing the steady-state management of the magnification level of the GUI of the display device; comparing the computational resource load to a computational resource threshold; determining, based on the comparing, that the computational resource load is greater than the computational resource threshold; and in response to the determining, offloading at least a portion of the steady-state management of the magnification level of the GUI of the display device to a cloud-based information handling system.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
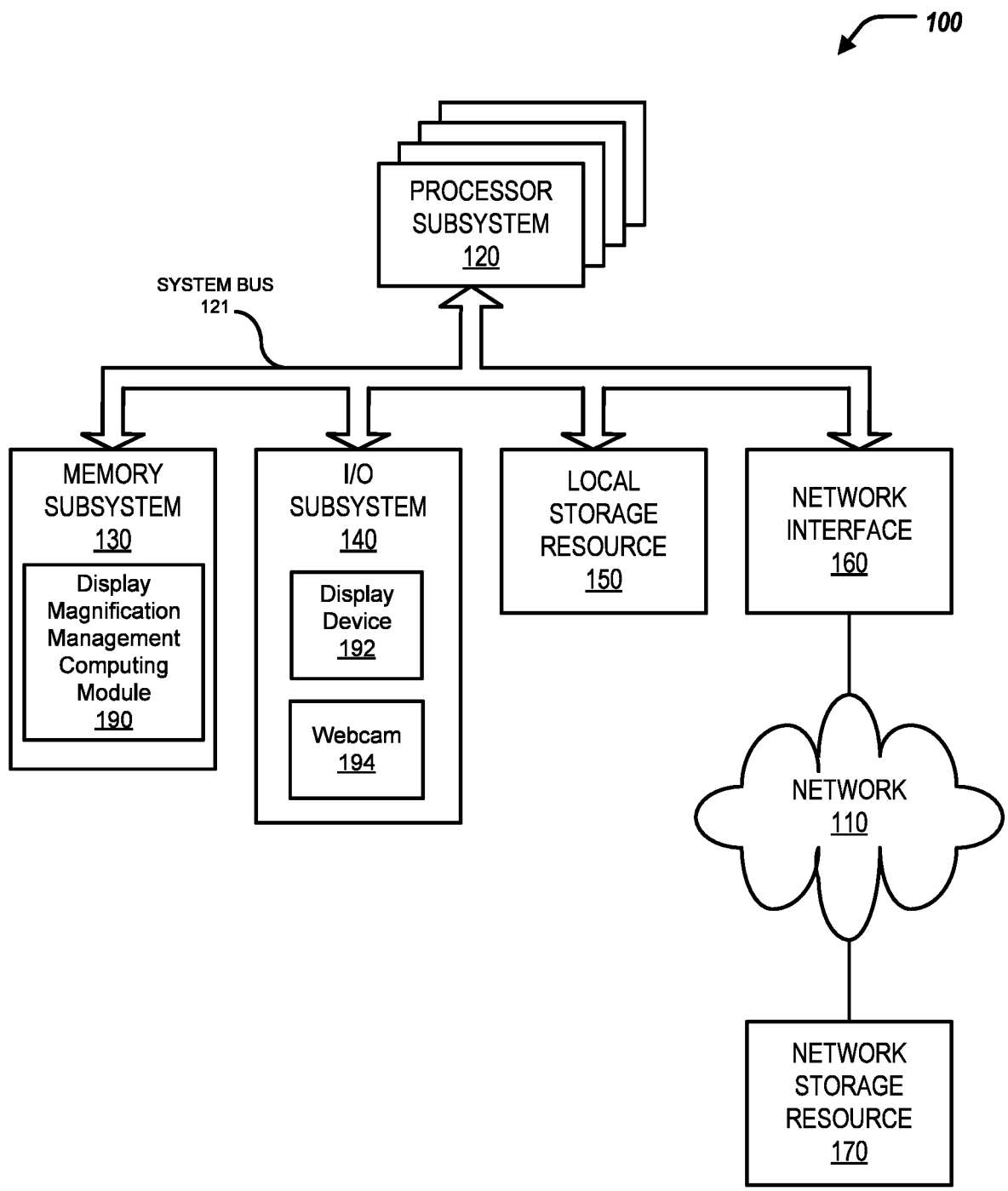
FIG. 1 is a block diagram of selected elements of an embodiment of an information handling system.

This disclosure discusses methods and systems for managing a magnification level of a graphical user interface of a display device associated with an information handling system. In short, based on eye gestures of a user associated with the information handling system, a distance of the user respect to the display device, a posture of the user, and similar metrics, images/video of the user can be analyzed such that a resolution/magnification of the graphical user interface can be adjusted.

Specifically, this disclosure discusses a system and a method for managing a magnification level of a graphical user interface (GUI) of a display device associated with an information handling system, including: performing, at a first time, a calibration and configuration of a display magnification management model, including: identifying contextual data associated with contextual inputs of a user associated with the information handling system, the contextual data including i) a blink rate of the user associated with the information handling system and ii) a distance between the user and the display device of the information handling system; identifying display settings of the GUI of the display device; training, based on the contextual data and the display settings, the display magnification management model, including generating a configuration policy including configuration rules, the configuration rules for performing computer-implemented actions to automatically adjust the magnification level of the GUI of the display device without user interaction; performing, at a second time, a steady-state management of the magnification level of the GUI of the display device, including: monitoring the contextual inputs of the of the user associated with the information handling system; and in response to monitoring the contextual inputs of the user associated with the information handling system, i) accessing the display magnification management model including the configuration policy, ii) identifying one or more of the configuration rules based on the display settings of the GUI and the monitored contextual inputs, and iii) applying the one or more configuration rules to perform one or more of the computer-implemented actions to automatically adjust the magnification level of the GUI of the display device without user interaction.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

The I/O subsystem 140 can further include a display device 192 and a web camera (or web cam or webcam) 194.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a display magnification management computing module 190. The display magnification management computing module 190 can be included by the memory subsystem 130. The display magnification management computing module 190 can include a computer-executable program (software). The display magnification management computing module 190 can be executed by the processor subsystem 120.

In short, the display magnification management computing module 190 and the web cam 194 can adjust/control/manage a magnification of a graphical user interface (GUI) of the display device 192 based on metrics of a user associated with the information handling system 100. For example, based on eye gestures of the user, distance of the user with respect to the display device 192, a posture of the user, and similar metrics, the web cam 194 can capture images/video of the user for analysis by the magnification management computing module 190. The magnification management computing module 190 can adjust the resolution/magnification of the GUI of the display device 194 based on such analysis, described further herein.

Figure 2:
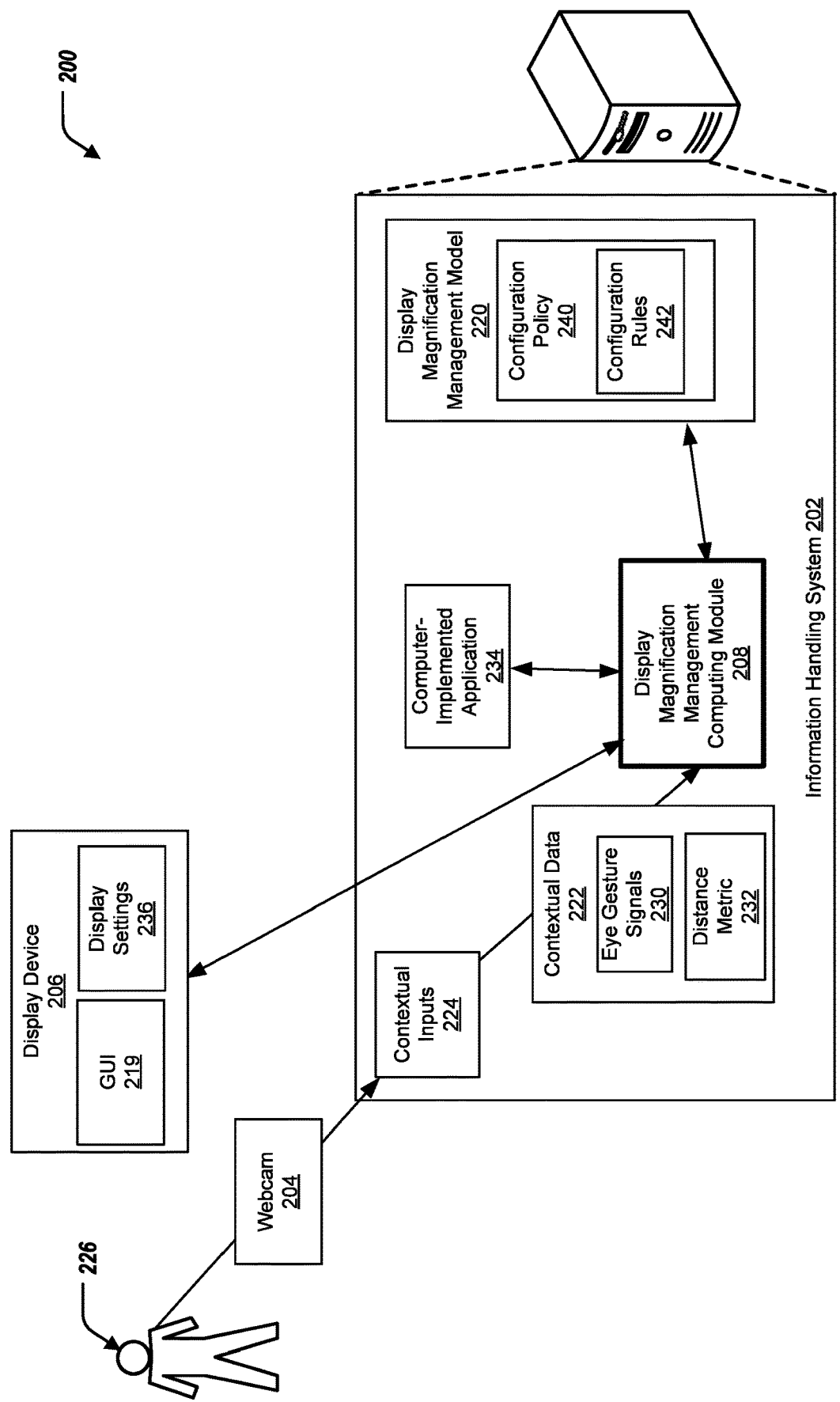
FIG. 2 illustrates a block diagram of an information handling system for managing a magnification level of a graphical user interface of a display device, in a first embodiment.

Turning to FIG. 2, FIG. 2 illustrates an environment 200 including an information handling system 202, a webcam 204, and a display device 206. The information handling system 202 can include a display magnification management computing module 208. In some examples, the information handling system 202 is similar to, or includes, the information handling system 100 of FIG. 1.

In some examples, the information handling system 202 is the same, or substantially the same, as the information handling system 100 of FIG. 1. In some examples, the webcam 204 is the same, or substantially the same, as the webcam 194 of FIG. 1. In some examples, the display device 206 is the same, or substantially the same, as the display device 192 of FIG. 1. In some examples, the display magnification management computing module 208 is the same, or substantially the same, as the display magnification management computing module 190 of FIG. 1.

The information handling system 202 can be in communication with the webcam 204 and the display device 206, and specifically, the display magnification management computing module 208 can be in communication with the webcam 204 and the display device 206.

In some implementations, the magnification management computing module 208 can manage a magnification level of a graphical user interface (GUI) 219 of the display device 206. Specifically, the display magnification management computing module 208 can perform a calibration and a configuration of a display magnification management model 220. Performing of the calibration and the configuration of the display magnification management model 220 can include identifying contextual data 222 associated with contextual inputs 224 of a user 226 of the information handling system 202 (user 226 associated with the information handling system 202).

Specifically, the webcam 204 can detect one or more signals associated with the user 226 and provide the contextual data 222 associated with the contextual inputs 224 to the display magnification computing module 208.

For example, the contextual data 222 can include eye gesture signals 230. In some examples, the eye gesture signals 230 can include a blink rate of the user 226 (i.e., a blink rate of one or both eyes of the user 226). The blink rate of the user 226 can include a blink rate of the user 226 when the user 226 is engaged with the information handling system 202, and specifically, the display device 206. The webcam 204 can provide images of the user 226 to the display magnification management computing module 208 such that the display magnification computing module 208 can determine the blink rate of the user 226 over a time period (e.g., 1 second, 30 seconds, 1 minute, 2 minutes, etc.). In some examples, the eye gesture signals 230 can include a pupil size of the user 226 (i.e., a pupil size of one or both eyes of the user 226). The pupil size of the user 226 can include a blink rate of the user 226 when the user 226 is engaged with the information handling system 202, and specifically, the display device 206. The webcam 204 can provide images of the user 226 to the display magnification management computing module 208 such that the display magnification computing module 208 can determine the pupil size of the user 226 over a time period (e.g., 1 second, 30 seconds, 1 minute, 2 minutes, etc.)— an "average" pupil size.

For example, the contextual data 222 can include a distance metric 232. The distance metric 232 can indicate a distance between the user 226 and the display device 206, and in particular, a distance between the eyes of the user 226 and the display device 206. The distance metric 232 of the user 226 can include a distance of the user 226 when the user 226 is engaged with the information handling system 202, and specifically, the display device 206. The webcam 204 can provide images of the user 226 to the display magnification management computing module 208 such that the display magnification computing module 208 can determine the distance metric 232 over a time period (e.g., 1 second, 30 seconds, 1 minute, 2 minutes, etc.)— an "average" distance between the user 226 and the display device 206.

In some examples, the distance metric 230 can further indicate a "posture" of the user 226 with respect to the display device 206—e.g., a posture of the neck and shoulders of the user 226 (in terms of angle) with respect to the display device 206. In some examples, the distance metric 232 can further indicate a line of sight (in degrees) of the user 226 with respect to the display device 206.

In some examples, the contextual data 222 can further indicate environmental factors of the information handling system 202, including a temperature, time, and similar factors. In some examples, the contextual data 222 can indicate an age of the user 226.

In some examples, performing the calibration and the configuration of the display magnification management model 220 can include identifying a computer-implemented application 234 that is currently executing by the information handling system 202 and is associated with the GUI 219 of the display device 206. That is, the computer-implemented application 234 can provide the GUI 219 that is currently being displayed by the display device 206.

Moreover, performing the calibration and the configuration of the display magnification management model 220 can include identifying display settings 236 of the GUI 219 and/or the display device 206. The display settings 236 of the GUI 219 can include a resolution size of the GUI 219, a display size of the display device 206, a count of the display devices 206 (e.g., dual-monitor), a display type (LCD, OLED, etc.) of the display device 206, a font size of text displayed by the GUI 219, a screen ratio of the GUI 219, and similar settings.

The display magnification management computing module 208 can train, based on the contextual data 222 and the display settings 236, the display magnification management model 220. Specifically, the display magnification management computing module 206 can generate, based on the contextual data 222 identified at the first time and the display settings 236, a configuration policy 240 that includes configuration rules 242. In some examples, the configuration rules 242 are rules for automatically performing computer-implemented actions to automatically adjust the magnification level of the GUI 219 of the display device 206 without user interaction.

To that end, the display magnification management computing module 208 can train the display magnification management model 220 to establish connections between the contextual data 222 and the configuration rules 242. Specifically, the display magnification management model 220 can identify one or more configurations rules 242 to be applied based on a connection with one or more of the contextual data 222, and the display settings 236. In some examples, the display magnification management computing module 206 can train the display magnification management model 210 using a machine learning process, and/or a neural network.

In some examples, the configuration rules 216 can include automatically increasing the magnification level of the GUI 219. In some example, the configuration rules 216 can include automatically increasing the magnification level of the GUI 219 a threshold amount (e.g., 5%, 10%, etc.). In some examples, the configuration rules 216 can include automatically decreasing the magnification level of the GUI 219. In some example, the configuration rules 216 can include automatically decreasing the magnification level of the GUI 219 a threshold amount (e.g., 5%, 10%, etc.).

In some examples, the display magnification management computing module 208 can train, based on the contextual data 222, the display settings 236, and the computer-implemented application 234 currently executing by the information handling system 202, the display magnification management model 220. Specifically, the display magnification management computing module 206 can generate, based on the contextual data 222 identified at the first time, the display settings 236, and the computer-implemented application 234, the configuration policy 240 that includes the configuration rules 242. In some examples, the configuration rules 242 are rules for automatically performing computer-implemented actions to automatically adjust the magnification level of the GUI 219 of the display device 206 without user interaction.

To that end, the display magnification management computing module 208 can train the display magnification management model 220 to establish connections between the contextual data 222 and the configuration rules 242. Specifically, the display magnification management model 220 can identify one or more configurations rules 242 to be applied based on a connection with one or more of the contextual data 222, the display settings 236, and the computer-implemented application 234. In some examples, the display magnification management computing module 206 can train the display magnification management model 210 using a machine learning process, and/or a neural network.

The display magnification management computing module 208 can perform, at a second time (after the first time), a steady-state management of the magnification level of the GUI 219 of the display device 206. Specifically, the display magnification management computing module 208 can monitor the contextual inputs 224 associated with the user 226. In some examples, the webcam 204 can detect one or more signals associated with the user 226 and provide the contextual data 222 associated with the contextual inputs 224 to the display magnification computing module 208. For example, such contextual data 222 can include the eye gesture signals 230 and the distance metric 232.

In some implementations, the display magnification management computing module 208 can, in response to monitoring the contextual inputs 224 of the user 226, access the display magnification management model 220 including the configuration policy 240. The display magnification management computing module 208 can further identify one or more of the configuration rules 242 based on the monitored contextual inputs 224 and the display settings 236 of the GUI 219. Furthermore, the display magnification management computing module 206 can apply the configuration rules 242 to the information handling system 202, and in particular, to the display device 206 and the GUI 219. In other words, the display magnification management computing module 206 can apply appropriate configuration rules 242 based on the monitored contextual inputs 224 and the display settings 236 as provided by the display magnification management model 220. In some examples, the display magnification management computing module 206 can apply the configuration rules 242 to perform one or more of the computer-implemented actions to automatically adjust the magnification level of the GUI 219 without user interaction.

In some implementations, the display magnification management computing module 208 can, in response to monitoring the contextual inputs 224 of the user 226, access the display magnification management model 220 including the configuration policy 240. The display magnification management computing module 208 can further identify one or more of the configuration rules 242 based on the monitored contextual inputs 224, the display settings 236 of the GUI 219, and the computer-implemented application 234 currently executing by the information handling system 202. Furthermore, the display magnification management computing module 206 can apply the configuration rules 242 to the information handling system 202, and in particular, to the display device 206 and the GUI 219. In other words, the display magnification management computing module 206 can apply appropriate configuration rules 242 based on the monitored contextual inputs 224, the display settings 236, and the computer-implemented application 234 currently executing by the information handling system 202 as provided by the display magnification management model 220. In some examples, the display magnification management computing module 206 can apply the configuration rules 242 to perform one or more of the computer-implemented actions to automatically adjust the magnification level of the GUI 219 without user interaction.

In some examples, the display magnification management computing module 208 can perform the steady-state management of the magnification level of the GUI 219 iteratively.

For example, the display magnification management computing module 208 can monitor the contextual inputs 224 and determine that the contextual data 222 indicates a first blink rate of the user 226 (while the user 226 is interacting with the display device 206) and a first distance of the user 226 with respect to the display device 206. The display magnification management computing module 208 can further detect display settings 236 of the display device 206 of a first resolution size and a single monitor. The display magnification management computing module 208 can further identify a first computer-implemented application 234 that is currently executing by the information handling system 202. In response, the display magnification management computing module 206 can access the display magnification management model 220, identify the configuration rules 242 that are applicable to i) the first blink rate, ii) the first distance, iii) the first resolution size, iv) a single monitor, and v) the first computer-implemented application 234, and apply such configuration rules 242. For example, the display magnification management computing module 206 can apply configuration rules 242 to increase the magnification level of the GUI 219 without user interaction a certain first percentage (e.g., 10% increase in magnification of the GUI 219).

For example, the display magnification management computing module 208 can monitor the contextual inputs 224 and determine that the contextual data 222 indicates a second blink rate of the user 226 (while the user 226 is interacting with the display device 206) and a second distance of the user 226 with respect to the display device 206. The display magnification management computing module 208 can further detect display settings 236 of the display device 206 of a second resolution size and a dual monitor. The display magnification management computing module 208 can further identify a second computer-implemented application 234 that is currently executing by the information handling system 202. In response, the display magnification management computing module 206 can access the display magnification management model 220, identify the configuration rules 242 that are applicable to i) the second blink rate, ii) the second distance, iii) the second resolution size, iv) a dual monitor, and v) the second computer-implemented application 234, and apply such configuration rules 242. For example, the display magnification management computing module 206 can apply configuration rules 242 to increase the magnification level of the GUI 219 without user interaction a certain second percentage (e.g., 20% increase in magnification of the GUI 219).

Figure 3:
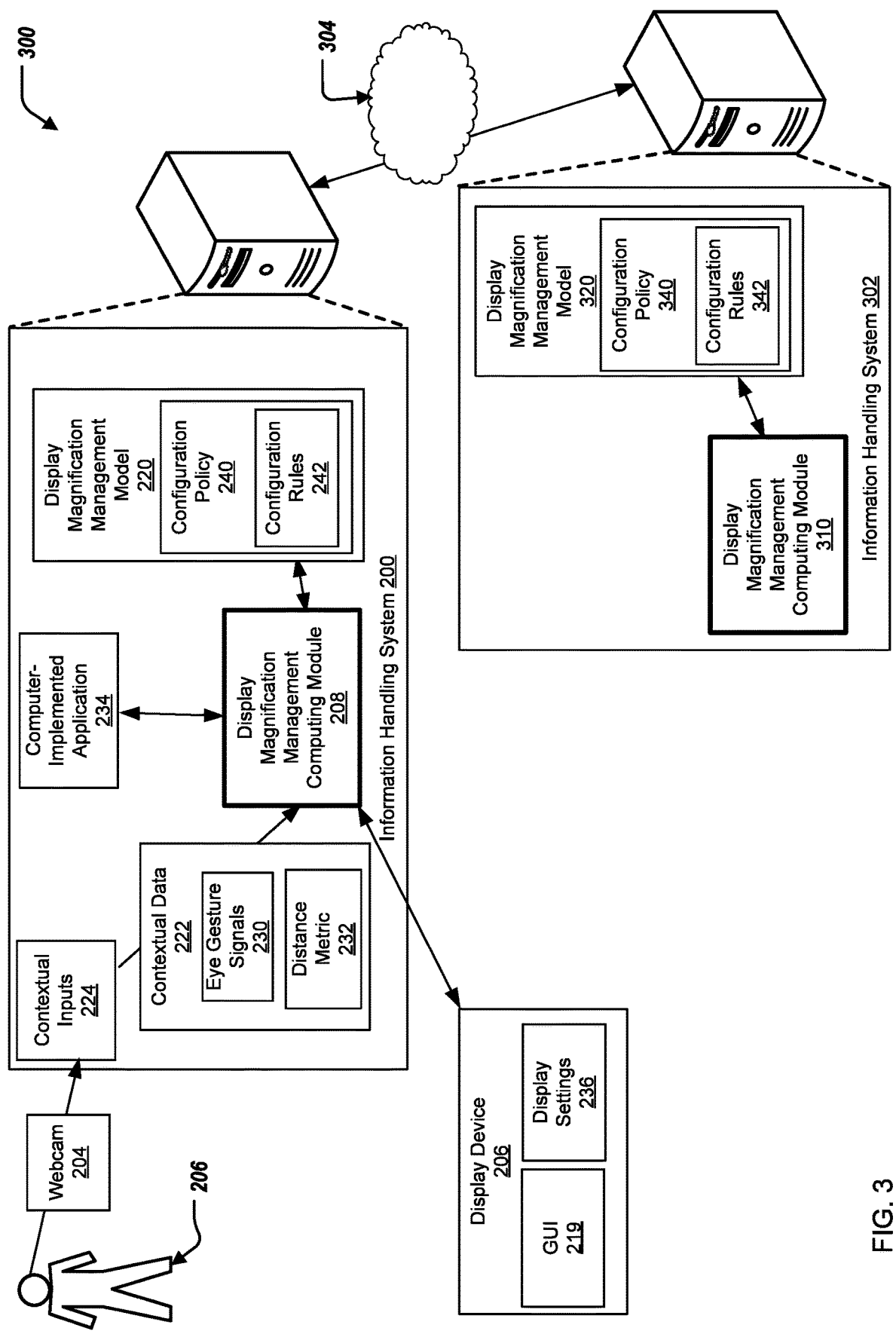
FIG. 3 illustrates a block diagram of an information handling system for managing a magnification level of a graphical user interface of a display device, in a second embodiment.

Turning to FIG. 3, FIG. 3 illustrates an environment 300 including the information handling system 200, the webcam 204, and the display device 206, all shown in FIG. 2. The environment 300 can further include an information handling system 302 and a network 304 (e.g., the Internet).

The information handling system 302 can include a display magnification management computing module 310. In some examples, the information handling system 302 is the same, or substantially the same, as the information handling system 100 of FIG. 1. In some examples, the display magnification management computing module 310 is the same, or substantially the same, as the display magnification management computing module 190 of FIG. 1. In some examples, the display magnification management computing module 310 is the same as (replica) of the display magnification management computing module 208.

The information handling system 202 can be in communication with the information handling system 302 over the network 304.

In some implementations, the magnification management computing modules 208, 310 can manage a magnification level of the GUI 219 of the display device 206. Specifically, in some cases, a portion of the steady-state management of the magnification level of the GUI 219 can be offloaded to the (cloud-based) information handling system 302. To that end, the information handling system 302 can include a display magnification management model 320 that is the same as (replica) of the display magnification management model 220, including a configuration policy 340 and configuration rules 342 that are the same as (replica) of the configuration policy 240 and the configuration rules 242, respectively, of the display magnification management model 220.

In some cases, the display magnification management computing module 208, during performing the steady-state management of the magnification level of the GUI 219 of the display device 206, can determine a currently elapsed time for performing the steady-state management of the magnification level of the GUI 219 of the display device 206. The display magnification management computing module 208 can compare the currently elapsed time (for performing the steady-state management of the magnification level of the GUI 219) with a time threshold. The time threshold can be stored by memory of the information handling system 200 that is accessible by the display magnification management computing module 208. The time threshold can be based on operating conditions of the information handling system 200, an expected processing time of the steady-state management of the magnification level of the GUI 219 by the information handling system 200, and similar. The display magnification management computing module 208 can determine, based on the comparing, that the currently elapsed time is greater than the time threshold. That is, the currently elapsed time for performing the steady-state management of the magnification level of the GUI 219 is greater than the time threshold.

The display magnification management computing module 208, in response to determining that the currently elapsed time is greater than the time threshold, offloads at least a portion of the steady-state management of the magnification level of the GUI 219 to the information handling system 302. That is, in response to determining that the currently elapsed time is greater than the time threshold, the information handling system 200, and in particular the display magnification management computing module 208, provides data (over the network 304) to the information handling system 302 such that the display magnification management computing module 310 performs the steady-state management of the magnification level of the GUI 219 of the display device 206. The data that the information handling system 200 provides to the information handling system 302 can include the contextual data 222, partially processed results from the contextual data 222 (from partially performing the steady-state management of the magnification level of the GUI 219), or both.

The display magnification management computing module 310 can perform the steady-state management of the magnification level of the GUI 219 (similar to that mentioned herein with respect to the display magnification management computing module 208), including accessing the display magnification management model 320 including the configuration policy 340; and identifying one or more of the configuration rules 342 based on the monitored contextual inputs 224, the display settings 236 of the GUI 219, and the computer-implemented application 234 currently executing by the information handling system 202. The information handling system 302 can provide data back (over the network 304) to the information handling system 200, and in particular, the display magnification management computing module 208, indicating the identified configuration rules 342. In response, the display magnification management computing module 206 can apply the configuration rules 342 to the display device 206 and the GUI 219. In other words, the display magnification management computing module 206 can apply appropriate configuration rules 342 as provided by the information handling system 302, and in particular, the display magnification management computing module 310. In some examples, the display magnification management computing module 208 can apply the configuration rules 342 to perform one or more of the computer-implemented actions to automatically adjust the magnification level of the GUI 219 without user interaction.

In some cases, the display magnification management computing module 208, during performing the steady-state management of the magnification level of the GUI 219 of the display device 206, can determine a computational resource load for performing the steady-state management of the magnification level of the GUI 219 of the display device 206. The display magnification management computing module 208 can compare the computational resource load (for performing the steady-state management of the magnification level of the GUI 219) with a computational resource threshold. The computational resource threshold can be stored by memory of the information handling system 200 that is accessible by the display magnification management computing module 208. The computational resource threshold can be based on operating conditions of the information handling system 200, an expected processing time of the steady-state management of the magnification level of the GUI 219 by the information handling system 200, and similar. The display magnification management computing module 208 can determine, based on the comparing, that the computational resource load is greater than the computational resource threshold. That is, the computational resource load for performing the steady-state management of the magnification level of the GUI 219 is greater than the computational resource threshold.

The display magnification management computing module 208, in response to determining that the computational resource load is greater than the computational resource threshold, offloads at least a portion of the steady-state management of the magnification level of the GUI 219 to the information handling system 302. That is, in response to determining that the computational resource load is greater than the computational resource threshold, the information handling system 200, and in particular the display magnification management computing module 208, provides data (over the network 304) to the information handling system 302 such that the display magnification management computing module 310 performs the steady-state management of the magnification level of the GUI 219 of the display device 206. The data that the information handling system 200 provides to the information handling system 302 can include the contextual data 222, partially processed results from the contextual data 222 (from partially performing the steady-state management of the magnification level of the GUI 219), or both.

The display magnification management computing module 310 can perform the steady-state management of the magnification level of the GUI 219 (similar to that mentioned herein with respect to the display magnification management computing module 208), including accessing the display magnification management model 320 including the configuration policy 340; and identifying one or more of the configuration rules 342 based on the monitored contextual inputs 224, the display settings 236 of the GUI 219, and the computer-implemented application 234 currently executing by the information handling system 202. The information handling system 302 can provide data back (over the network 304) to the information handling system 200, and in particular, the display magnification management computing module 208, indicating the identified configuration rules 342. In response, the display magnification management computing module 206 can apply the configuration rules 342 to the display device 206 and the GUI 219. In other words, the display magnification management computing module 206 can apply appropriate configuration rules 342 as provided by the information handling system 302, and in particular, the display magnification management computing module 310. In some examples, the display magnification management computing module 208 can apply the configuration rules 342 to perform one or more of the computer-implemented actions to automatically adjust the magnification level of the GUI 219 without user interaction.

Figure 4:
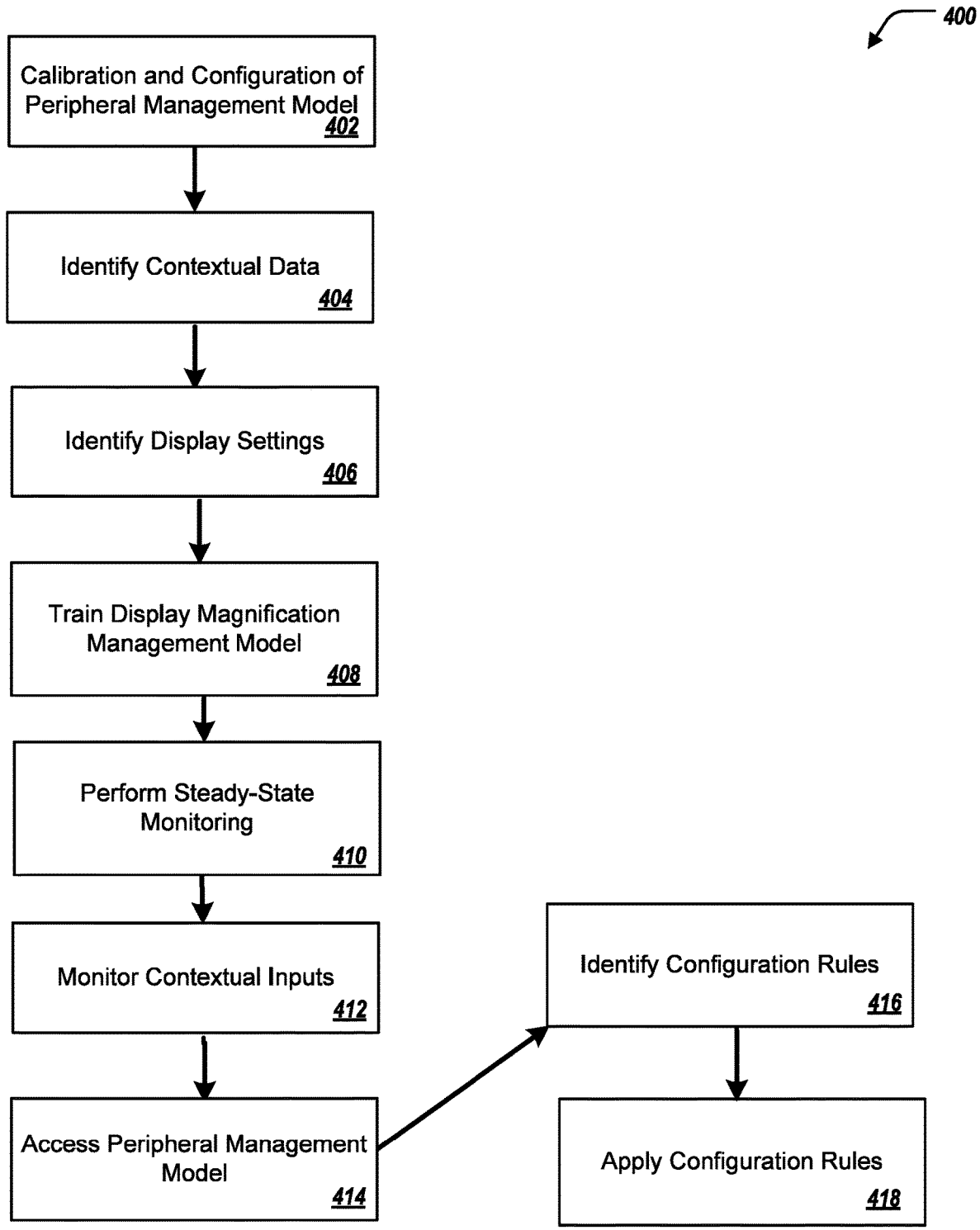
FIG. 4 illustrates a method for managing a magnification level of a graphical user interface of a display device.

FIG. 4 illustrates a flowchart depicting selected elements of an embodiment of a method 400 for managing a magnification level of a graphical user interface of a display device. The method 400 may be performed by the information handling system 100, the information handling system 202, the information handling system 302, the display magnification management computing module 208, and/or the display magnification management computing module 310, and with reference to FIGS. 1-3. It is noted that certain operations described in method 400 may be optional or may be rearranged in different embodiments.

The display magnification management computing module 208 can perform a calibration and a configuration of a display magnification management model 220 (402). The display magnification management computing module 208 can identify the contextual data 222 associated with the contextual inputs 224 of the user 226 the information handling system 202 (404). The display magnification management computing module 208 can identify display settings 236 of the GUI 219 and/or the display device 206 (406). The display magnification management computing module 208 can train the display magnification management model 220 (408). The display magnification management computing module 208 can perform, at a second time (after the first time), a steady-state management of the magnification level of the GUI 219 of the display device 206 (410). The display magnification management computing module 208 can monitor the contextual inputs 224 associated with the user 226 (412). In some implementations, the display magnification management computing module 208 can, in response to monitoring the contextual inputs 224 of the user 226, access the display magnification management model 220 (414). The display magnification management computing module 208 can identify one or more of the configuration rules 242 (416). The display magnification management computing module 206 can apply the configuration rules 242 to the display device 206 and the GUI 219 (418).

Figure 5:
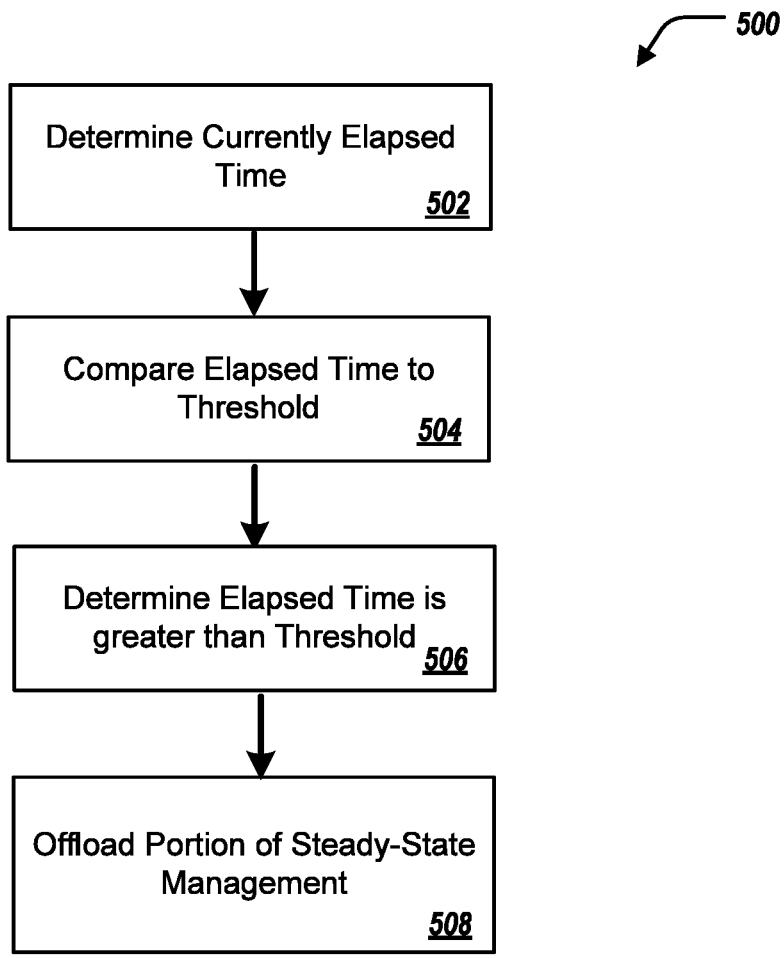
FIGS. 5, 6 illustrate respective methods for offloading of managing a magnification level of a graphical user interface of a display device.

FIG. 5 illustrates a flowchart depicting selected elements of an embodiment of a method 500 for offloading of managing a magnification level of a graphical user interface of a display device. The method 500 may be performed by the information handling system 100, the information handling system 202, the information handling system 302, the display magnification management computing module 208, and/or the display magnification management computing module 310, and with reference to FIGS. 1-3. It is noted that certain operations described in method 500 may be optional or may be rearranged in different embodiments.

The display magnification management computing module 208, during performing the steady-state management of the magnification level of the GUI 219 of the display device 206, can determine a currently elapsed time for performing the steady-state management of the magnification level of the GUI 219 of the display device 206 (502). The display magnification management computing module 208 can compare the currently elapsed time (for performing the steady-state management of the magnification level of the GUI 219) with a time threshold (504). The display magnification management computing module 208 can determine, based on the comparing, that the currently elapsed time is greater than the time threshold (506). The display magnification management computing module 208, in response to determining that the currently elapsed time is greater than the time threshold, offloads at least a portion of the steady-state management of the magnification level of the GUI 219 to the information handling system 302 (508).

Figure 6:
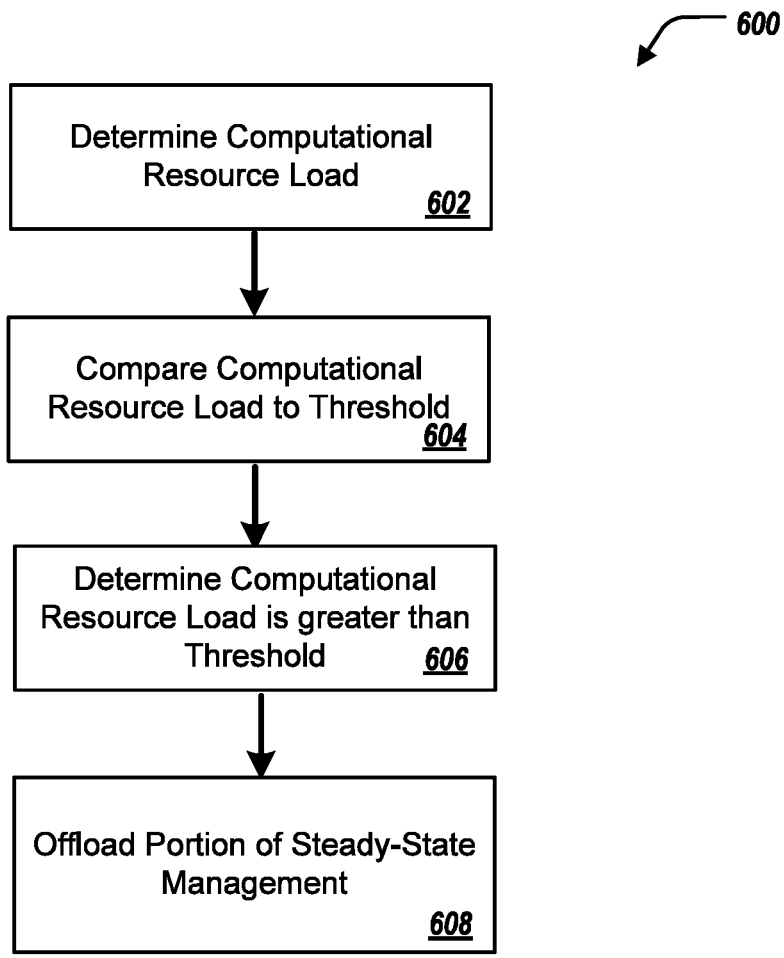

FIG. 6 illustrates a flowchart depicting selected elements of an embodiment of a method 600 for offloading of managing a magnification level of a graphical user interface of a display device. The method 600 may be performed by the information handling system 100, the information handling system 202, the information handling system 302, the display magnification management computing module 208, and/or the display magnification management computing module 310, and with reference to FIGS. 1-3. It is noted that certain operations described in method 600 may be optional or may be rearranged in different embodiments.

The display magnification management computing module 208, during performing the steady-state management of the magnification level of the GUI 219 of the display device 206, can determine a computational resource load for performing the steady-state management of the magnification level of the GUI 219 of the display device 206 (602). The display magnification management computing module 208 can compare the computational resource load (for performing the steady-state management of the magnification level of the GUI 219) with a computational resource threshold (604). The display magnification management computing module 208 can determine, based on the comparing, that the computational resource load is greater than the computational resource threshold (606). The display magnification management computing module 208, in response to determining that the computational resource load is greater than the computational resource threshold, offloads at least a portion of the steady-state management of the magnification level of the GUI 219 to the information handling system 302 (608).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for managing a magnification level of a graphical user interface (GUI) of a display device associated with an information handling system, comprising:

performing, at a first time, a calibration and configuration of a display magnification management model, including:
identifying contextual data associated with contextual inputs of a user associated with the information handling system, the contextual data including i) a blink rate of the user associated with the information handling system and ii) a distance between the user and the display device of the information handling system;
identifying display settings of the GUI of the display device;
training, based on the contextual data and the display settings, the display magnification management model, including generating a configuration policy including configuration rules, the configuration rules for performing computer-implemented actions to automatically adjust the magnification level of the GUI of the display device without user interaction;
performing, at a second time, a steady-state management of the magnification level of the GUI of the display device, including:
monitoring the contextual inputs of the of the user associated with the information handling system;
in response to monitoring the contextual inputs of the user associated with the information handling system, i) accessing the display magnification management model including the configuration policy, ii) identifying one or more of the configuration rules based on the display settings of the GUI and the monitored contextual inputs, and iii) applying the one or more configuration rules to perform one or more of the computer-implemented actions to automatically adjust the magnification level of the GUI of the display device without user interaction;
determining a currently elapsed time for performing the steady-state management of the magnification level of the GUI of the display device;
comparing the currently elapsed time to a time threshold;
determining, based on the comparing, that the currently elapsed time is greater than the time threshold; and
in response to the determining, offloading at least a portion of the steady-state management of the magnification level of the GUI of the display device to a cloud-based information handling system.

2. The computer-implemented method of claim 1, wherein the display settings of the GUI includes a resolution of the GUI, a font size of text displayed by the GUI, and a screen ratio of the GUI.

3. The computer-implemented method of claim 1, wherein the contextual data further includes a pupil size of the user associated with the information handling system.

4. The computer-implemented method of claim 1, wherein performing the calibration and configuration of the display magnification management model further comprises:
identifying a computer-implemented application currently executing by the information handling system and is associated with the GUI of the display device; and
training, based on i) the contextual data, ii) the display settings, and iii) the computer-implemented application currently executing by the information handling system, the display magnification management model, including generating the configuration policy including configuration rules, the configuration rules for performing computer-implemented actions to automatically adjust the magnification level of the GUI of the display device without user interaction.

5. The computer-implemented method of claim 4, wherein performing a steady-state management of the magnification level of the GUI of the display device further comprises:
in response to monitoring the contextual inputs of the user associated with the information handling system, i) accessing the display magnification management model including the configuration policy, ii) identifying one or more of the configuration rules based on the display settings of the GUI, the computer-implemented application currently executing by the information handling system, and the monitored contextual inputs, and iii) applying the one or more configuration rules to perform one or more of the computer-implemented actions to automatically adjust the magnification level of the GUI of the display device without user interaction.

6. The computer-implemented method of claim 1, further comprising:
determining a computational resource load of performing the steady-state management of the magnification level of the GUI of the display device;
comparing the computational resource load to a computational resource threshold;
determining, based on the comparing, that the computational resource load is greater than the computational resource threshold; and
in response to the determining, offloading at least a portion of the steady-state management of the magnification level of the GUI of the display device to a cloud-based information handling system.

7. An information handling system comprising a processor having access to memory media storing instructions executable by the processor to perform operations, comprising:
performing, at a first time, a calibration and configuration of a display magnification management model, including:
identifying contextual data associated with contextual inputs of a user associated with the information handling system, the contextual data including i) a blink rate of the user associated with the information handling system and ii) a distance between the user and the display device of the information handling system;
identifying display settings of the GUI of the display device;
training, based on the contextual data and the display settings, the display magnification management model, including generating a configuration policy including configuration rules, the configuration rules for performing computer-implemented actions to automatically adjust the magnification level of the GUI of the display device without user interaction;
performing, at a second time, a steady-state management of the magnification level of the GUI of the display device, including:
monitoring the contextual inputs of the of the user associated with the information handling system;
in response to monitoring the contextual inputs of the user associated with the information handling system, i) accessing the display magnification management model including the configuration policy, ii) identifying one or more of the configuration rules based on the display settings of the GUI and the monitored contextual inputs, and iii) applying the one or more configuration rules to perform one or more of the computer-implemented actions to automatically adjust the magnification level of the GUI of the display device without user interaction:
determining a currently elapsed time for performing the steady-state management of the magnification level of the GUI of the display device;
comparing the currently elapsed time to a time threshold;
determining, based on the comparing, that the currently elapsed time is greater than the time threshold; and
in response to the determining, offloading at least a portion of the steady-state management of the magnification level of the GUI of the display device to a cloud-based information handling system.

8. The information handling system of claim 7, wherein the display settings of the GUI includes a resolution of the GUI, a font size of text displayed by the GUI, and a screen ratio of the GUI.

9. The information handling system of claim 7, wherein the contextual data further includes a pupil size of the user associated with the information handling system.

10. The information handling system of claim 7, wherein performing the calibration and configuration of the display magnification management model further comprises:
identifying a computer-implemented application currently executing by the information handling system and is associated with the GUI of the display device; and
training, based on i) the contextual data, ii) the display settings, and iii) the computer-implemented application currently executing by the information handling system, the display magnification management model, including generating the configuration policy including configuration rules, the configuration rules for performing computer-implemented actions to automatically adjust the magnification level of the GUI of the display device without user interaction.

11. The information handling system of claim 10, wherein performing a steady-state management of the magnification level of the GUI of the display device further comprises:
in response to monitoring the contextual inputs of the user associated with the information handling system, i) accessing the display magnification management model including the configuration policy, ii) identifying one or more of the configuration rules based on the display settings of the GUI, the computer-implemented application currently executing by the information handling system, and the monitored contextual inputs, and iii) applying the one or more configuration rules to perform one or more of the computer-implemented actions to automatically adjust the magnification level of the GUI of the display device without user interaction.

12. The information handling system of claim 7, the operations further comprising:
determining a computational resource load of performing the steady-state management of the magnification level of the GUI of the display device;
comparing the computational resource load to a computational resource threshold;
determining, based on the comparing, that the computational resource load is greater than the computational resource threshold; and
in response to the determining, offloading at least a portion of the steady-state management of the magnification level of the GUI of the display device to a cloud-based information handling system.

13. A non-transitory computer-readable medium storing software comprising instructions executable by one or more computers which, upon such execution, cause the one or more computers to perform operations comprising:
performing, at a first time, a calibration and configuration of a display magnification management model, including:
identifying contextual data associated with contextual inputs of a user associated with the information handling system, the contextual data including i) a blink rate of the user associated with the information handling system and ii) a distance between the user and the display device of the information handling system;
identifying display settings of the GUI of the display device;
training, based on the contextual data and the display settings, the display magnification management model, including generating a configuration policy including configuration rules, the configuration rules for performing computer-implemented actions to automatically adjust the magnification level of the GUI of the display device without user interaction;
performing, at a second time, a steady-state management of the magnification level of the GUI of the display device, including:
monitoring the contextual inputs of the of the user associated with the information handling system;
in response to monitoring the contextual inputs of the user associated with the information handling system, i) accessing the display magnification management model including the configuration policy, ii) identifying one or more of the configuration rules based on the display settings of the GUI and the monitored contextual inputs, and iii) applying the one or more configuration rules to perform one or more of the computer-implemented actions to automatically adjust the magnification level of the GUI of the display device without user interaction;
determining a currently elapsed time for performing the steady-state management of the magnification level of the GUI of the display device;
comparing the currently elapsed time to a time threshold;
determining, based on the comparing, that the currently elapsed time is greater than the time threshold; and
in response to the determining, offloading at least a portion of the steady-state management of the magnification level of the GUI of the display device to a cloud-based information handling system.

14. The computer-readable medium of claim 13, wherein the display settings of the GUI includes a resolution of the GUI, a font size of text displayed by the GUI, and a screen ratio of the GUI.

15. The computer-readable medium of claim 13, wherein the contextual data further includes a pupil size of the user associated with the information handling system.

16. The computer-readable medium of claim 13, wherein performing the calibration and configuration of the display magnification management model further comprises:
identifying a computer-implemented application currently executing by the information handling system and is associated with the GUI of the display device; and
training, based on i) the contextual data, ii) the display settings, and iii) the computer-implemented application currently executing by the information handling system, the display magnification management model, including generating the configuration policy including configuration rules, the configuration rules for performing computer-implemented actions to automatically adjust the magnification level of the GUI of the display device without user interaction.

17. The computer-readable medium of claim 16, wherein performing a steady-state management of the magnification level of the GUI of the display device further comprises:
in response to monitoring the contextual inputs of the user associated with the information handling system, i) accessing the display magnification management model including the configuration policy, ii) identifying one or more of the configuration rules based on the display settings of the GUI, the computer-implemented application currently executing by the information handling system, and the monitored contextual inputs, and iii) applying the one or more configuration rules to perform one or more of the computer-implemented actions to automatically adjust the magnification level of the GUI of the display device without user interaction.

* * * * *